UNITED STATES PATENT OFFICE.

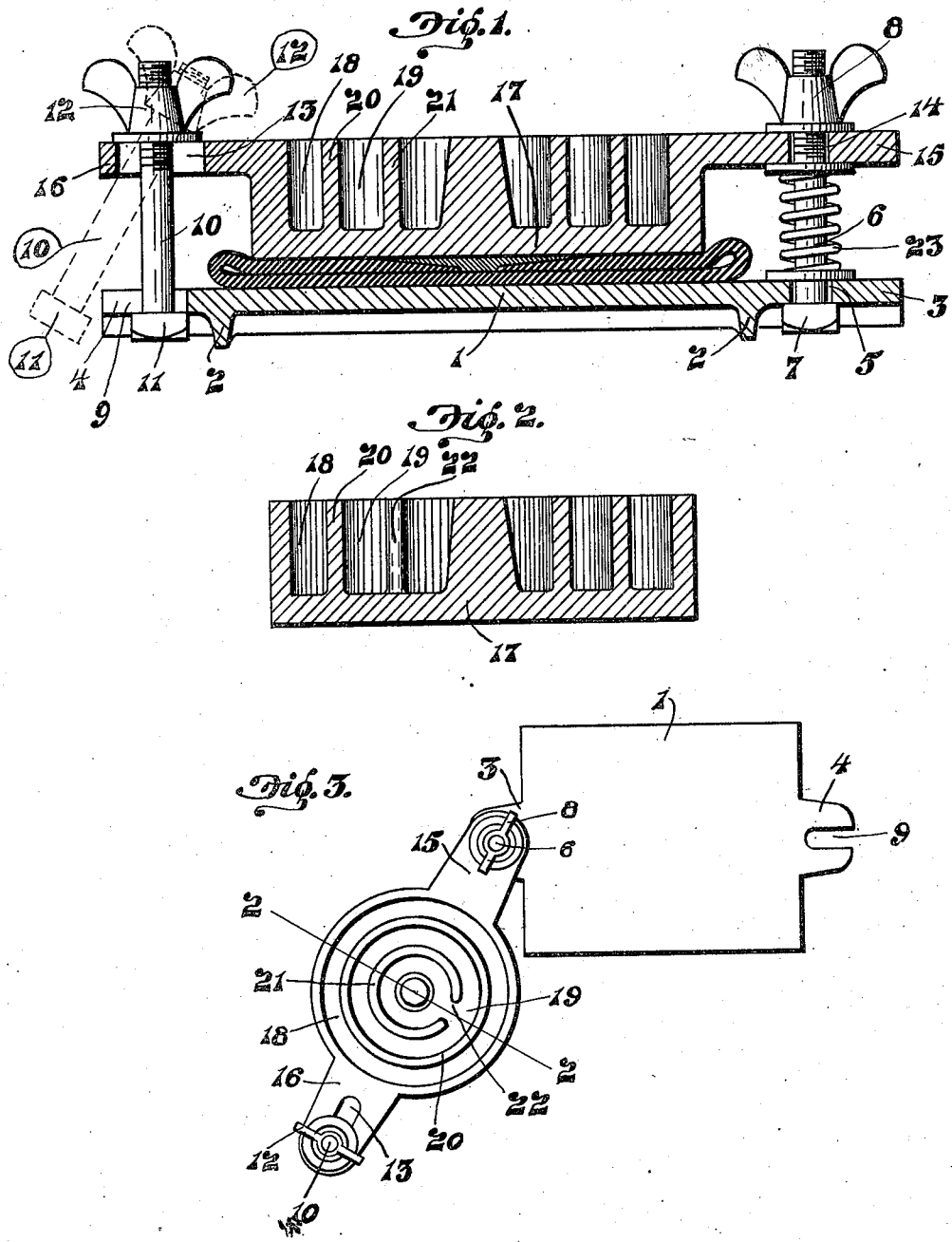

JOHN YEMIKER AND WALTER S. VOSBURGH, OF AKRON, OHIO; SAID VOSBURGH ASSIGNOR TO SAID YEMIKER.

VULCANIZER.

1,166,876.    Specification of Letters Patent.    Patented Jan. 4, 1916.

Application filed January 25, 1915. Serial No. 4,153.

*To all whom it may concern:*

Be it known that we, JOHN YEMIKER and WALTER S. VOSBURGH, both citizens of the United States, both residing at Akron, in the county of Summit and State of Ohio, have invented a new and useful Vulcanizer, of which the following is a specification.

Our invention relates to improvements in vulcanizers, in which the vulcanizer is applied to a puncture or small tears or cuts in a tube or tires.

The objects of our invention are, first, to provide means whereby the vulcanizer can be applied with little difficulty, second, to provide means for elevating the combined vulcanizing plate and cup so as to clear the same from the tube when swung into position for use and swung out of position after use, third, to provide means for adapting the degree of heat in the vulcanizing plate to the requirements, and fourth, to form the vulcanizer of such material that will prevent the parts coming in contact with the tube from adhering or sticking to the tube.

These objects, together with other objects readily apparent to those skilled in the art, may be attained by the construction illustrated in the accompanying drawings, although the invention may be embodied in other forms, the construction illustrated being chosen by way of example.

In the accompanying drawing: Figure 1 is a vertical section showing the different parts properly assembled and a tube placed in position to be repaired. Fig. 2 is a vertical section on line 2—2, Fig. 3. Fig. 3 is a top view showing the combined cup and vulcanizing plate turned out of position whereby a tube can be placed upon the base plate.

Similar numerals of reference indicate corresponding parts in all the figures of the drawing.

In the accompanying drawing, 1 represents the base which is formed of a size to correspond substantially with the size of the vulcanizer designed to be constructed. The base 1 is preferably provided with the strengthening ribs 2, which form a support for the base proper. The base 1 is provided with the extensions 3 and 4. The extension 3 is provided with the aperture 5, through which aperture the bolt 6 is passed, said bolt being provided with the head 7 and the nut 8, said nut being preferably a wing-nut so that the same can be easily rotated from time to time. The extension 4 is provided with the open slot 9, which open slot is for the purpose of receiving the lower end of the bolt 10, said bolt being provided with an ordinary head 11 and a wing-nut 12 or its equivalent. The bolts 6 and 10 are extended through suitable apertures 13 and 14 formed in the extensions 16 and 15, said extensions being located at the top or upper part of the combined cup and vulcanizing plate 17.

It is well understood that in repairing tubes or tires for automobiles such repairing varies, reference being had to the size of the puncture or tear to be repaired. In the repairing of small punctures it is only necessary to apply the heat direct to a small portion of the vulcanizing plate and in punctures or tears of larger size it is necessary to apply the heat to practically the entire surface of the vulcanizing plate. In order to localize the application of the heat we provide a number of separate chambers or cups 18 and 19, the cup 19 being inclosed by the annular flange 20 within which flange is located the flange 21, which flange is provided with the opening 22.

In use the necessary amount of liquid fuel is placed in the cups 18 and 19, but when a small puncture or tear is to be repaired, liquid fuel is placed in the inner cup 19 only, whereby heat is applied to only a small portion of the vulcanizing plate, it of course being understood that the entire plate becomes more or less heated by radiation. When it is desired to repair a puncture or tear of larger size, then in that event liquid fuel is placed in both the cups 18 and 19 whereby the entire plate is directly heated. In use the combined vulcanizing plate and cup is brought into the position illustrated in Fig. 1 and properly heated, it being understood that the tube or tire is to be properly placed between the base and the vulcanizing plate.

When it is desired to remove the vulcanizing plate the wingnuts 8 and 12 are rotated in the direction to move them upward upon the bolts and when so rotated the vulcanizing plate can be brought into the position illustrated in Fig. 3.

It will be understood that the bolt 10 must be swung into the position illustrated in dotted lines Fig. 1 so as to clear the same from the open ended slot 9, after which the cup is free to be rotated upon the bolt 6. In order that the vulcanizing plate will not drag or scrape upon the tube when it is brought into position for use or removed after use the spring 23 is provided, which spring lifts the cup and vulcanizing plate in a vertical direction, thereby bringing the vulcanizing plate out of pressure contact with the tube and when the opposite end of the vulcanizing plate is lifted to be turned the plate will be carried upon the spring 23, by which arrangement, all danger of displacing the patch on the tube in applying the vulcanizing plate is removed. After the vulcanizing plate has been brought into condition for use, both the wing-nuts are turned in the direction to properly clamp the tube.

We have learned from experience that when the vulcanizing plate and the base plate are made of iron or like material there is danger of injuring the tube or tire by reason of excessive adhesiveness and in order to overcome this difficulty we form the various parts of metal other than iron, thereby preventing the danger of injuring the tube or tire. We prefer to use an alloy, aluminum or like material. By the use of such an alloy excessive adhesiveness is prevented and the danger of scorching removed.

Having fully described our invention, what we claim as new and desire to secure by Letters Patent, is—

In a vulcanizer of the class described, the combination of a base and a combined cup and vulcanizing plate, the base provided with apertured and slotted extensions, the combined cup and vulcanizing plate provided with apertured extensions and bolts located diametrically opposite the vulcanizing plate, said bolts provided with clamping nuts, and a spring located around one of the bolts and intermediate the extensions carrying said bolt.

In testimony that we claim the above, we have hereunto subscribed our names in the presence of two witnesses.

JOHN YEMIKER.
WALTER S. VOSBURGH.

Witnesses:
W. W. WARNER,
J. A. REAGLE.